United States Patent
Haller (10) Patent No.: US 10,611,076 B2
(45) Date of Patent: Apr. 7, 2020

(54) METHOD FOR STARTING UP A BLOW MOULDING MACHINE, AND SYSTEM INCLUDING A BLOW MOULDING MACHINE

(71) Applicant: KRONES AG, Neutraubling (DE)

(72) Inventor: Markus Haller, Zeitlarn (DE)

(73) Assignee: KRONES AG, Neutraubling (DE)

( * ) Notice: Subject to any disclaimer, the term of this patent is extended or adjusted under 35 U.S.C. 154(b) by 481 days.

(21) Appl. No.: 14/929,464

(22) Filed: Nov. 2, 2015

(65) Prior Publication Data
US 2016/0136868 A1 May 19, 2016

(30) Foreign Application Priority Data
Nov. 18, 2014 (DE) .................. 10 2014 116 891

(51) Int. Cl.
*B29C 49/78* (2006.01)
*B29C 49/12* (2006.01)
(Continued)

(52) U.S. Cl.
CPC .............. *B29C 49/78* (2013.01); *B29C 49/12* (2013.01); *B29C 49/18* (2013.01); *B29C 49/36* (2013.01);
(Continued)

(58) Field of Classification Search
CPC . B29C 49/78; B29C 49/6409; B29C 49/4284; B29C 49/06; B29C 49/18;
(Continued)

(56) References Cited

U.S. PATENT DOCUMENTS

| 5,718,852 A | * | 2/1998 | Campbell | ............... B29C 49/42 264/40.1 |
| 6,576,171 B1 | * | 6/2003 | Devenoges | ............. B29C 49/12 264/40.1 |

(Continued)

FOREIGN PATENT DOCUMENTS

| CN | 101868341 | 10/2010 |
| CN | 103079796 | 5/2013 |

(Continued)

OTHER PUBLICATIONS

Apex Container Tech Inc, Simulation, Oct. 18, 2014, all pages : https://www.blowmolding.org/processor-tips/simulation (Year: 2014).*

(Continued)

*Primary Examiner* — Joseph S Del Sole
*Assistant Examiner* — Jerzi H Moreno Hernandez
(74) *Attorney, Agent, or Firm* — Onello & Mello, LLP (57) ABSTRACT

In a method for operating an apparatus for transforming plastic preforms into plastic containers, the apparatus acts upon a flowable medium to plastic preforms in order to expand these plastic preforms to form the plastic containers, and the apparatus carries out this transforming operation while taking account of a plurality of process parameters. The plurality of process parameters is determined on the basis of a machine model, wherein a predefined number of input parameters are transferred to this machine model and at least one processor unit determines the process parameters and/or values characteristic of these process parameters on the basis of these input parameters.

8 Claims, 6 Drawing Sheets

(51) Int. Cl.
    *B29C 49/42*   (2006.01)
    *B29C 49/28*   (2006.01)
    *B29C 49/36*   (2006.01)
    *B29C 49/18*   (2006.01)
    *B29C 49/38*   (2006.01)
    *B29L 31/00*   (2006.01)

(52) U.S. Cl.
    CPC .......... *B29C 49/4284* (2013.01); *B29C 49/38* (2013.01); *B29C 49/783* (2013.01); *B29C 2949/78537* (2013.01); *B29C 2949/78554* (2013.01); *B29C 2949/78806* (2013.01); *B29L 2031/7158* (2013.01)

(58) Field of Classification Search
    CPC .................... B29C 49/36; B29C 49/12; B29C 2949/78806; B29C 2949/7853; B29L 2031/7158; B29K 2105/258; G05B 17/00
    See application file for complete search history.

(56) References Cited

U.S. PATENT DOCUMENTS

| | | | |
|---|---|---|---|
| 9,676,158 | B2 | 6/2017 | Deau et al. |
| 2006/0212161 | A1* | 9/2006 | Bhat ................ B29C 49/78 700/197 |
| 2008/0183444 | A1* | 7/2008 | Grichnik ................ G05B 17/02 703/2 |
| 2008/0211125 | A1 | 9/2008 | Derrien et al. |
| 2009/0093892 | A1* | 4/2009 | Kant ................ G05B 13/04 700/29 |
| 2009/0108505 | A1* | 4/2009 | Steiner ................ B29C 49/78 264/535 |
| 2012/0226376 | A1 | 9/2012 | Haesendonckx et al. |
| 2013/0187304 | A1 | 7/2013 | Deau et al. |
| 2013/0231772 | A1 | 9/2013 | Hahn et al. |
| 2015/0190959 | A1* | 7/2015 | Deau ................ B29C 49/783 264/40.3 |
| 2016/0151957 | A1* | 6/2016 | Wolfe ................ B29C 49/78 425/140 |

FOREIGN PATENT DOCUMENTS

| | | | | |
|---|---|---|---|---|
| DE | 10338692 | A1 * | 4/2005 | ......... G05B 19/0423 |
| EP | 1777056 | | 4/2007 | |

OTHER PUBLICATIONS

Accuform, B-SIM Tutorial, 2011, all pages: http://www.t-sim.com/Refbsim/Tutorial.htm (Year: 2011).*

The State Intellectual Property Office of China report dated Jul. 3, 2017, issued in Application No. 2015107913886.

German Search Report dated Oct. 26, 2015 in corresponding German Patent Application No. 10 2014 116 891.7.

Extended European Search Report dated Apr. 1, 2016, issued in corresponding European Application No. 15195119.1-1706.

* cited by examiner

METHOD FOR STARTING UP A BLOW MOULDING MACHINE, AND SYSTEM INCLUDING A BLOW MOULDING MACHINE

RELATED APPLICATIONS

This application claims priority to German Patent Application Serial No. DE 10 2014 116 891.7, filed Nov. 18, 2014, the content of which is incorporated herein by reference, in its entirety.

FIELD

The present invention relates to a method for starting up and/or operating a blow moulding machine, and to a corresponding system including a blow moulding machine. It is known from the prior art that, by means of blow moulding machines and in particular stretch blow moulding machines, plastic preforms are expanded by being acted upon with compressed air and thus are transformed into containers, such as bottles in particular. In the process, the plastic preforms are usually transported by means of transforming stations and during this transport a flowable medium and in particular blowing air is acted upon in order to expand said preforms. In order to carry out this blow moulding process in an optimal manner, many different process parameters must be taken into account. Such process parameters are usually predefined by an operator or are in some cases adapted by means of a control method during production.

DESCRIPTION OF DRAWINGS

Further advantages and embodiments are evident from the accompanying drawings. In the drawings

DETAILED DESCRIPTION

In a method known from the applicant's internal prior art, closed control loops are used. In this case, process variables are detected during production and, in accordance with a control algorithm, a given control variable is readjusted to a guide variable that is to be set by the operator. The method known from the prior art thus always requires a readjustment during the production operation. In addition, the presetting of the individual parameters is relatively complicated for the user since he must also take account of relationships between these control variables.

A machine operator therefore has to be in control of a plurality of parameters, wherein interactions exist between some of these parameters. Even in the case of controlled parameter values, useful initial values and control parameters have to be set.

The object of the present invention is therefore to simplify the setting up or starting up of such apparatuses for transforming plastic preforms into plastic containers. This object is achieved according to the invention by a method and a machine arrangement according to the independent claims. Advantageous embodiments and further developments form the subject matter of the dependent claims.

In a method according to the invention for operating an apparatus for transforming plastic preforms into plastic containers, wherein this apparatus acts upon a flowable medium to plastic preforms in order to expand these plastic preforms to form the plastic containers, this apparatus carries out this transforming operation while taking account of a plurality of process parameters.

According to the invention, the plurality of process parameters is determined on the basis of a machine model, wherein a predefined number of input parameters are transferred to this machine model and at least one processor unit determines the process parameters and/or values characteristic of these process parameters on the basis of these input parameters.

As mentioned above, in the prior art all the parameters had to be set by a user and transferred directly to the machine. The invention now proposes that no longer are all the parameters set by the user himself and transferred to the machine, but instead partially transferred into a machine model and the latter determines the rest of the process parameters. The blow moulding machine therefore no longer has to be readjusted "online" during the production process, but rather is self-adjusting. It is thus preferably possible that, on the basis of a mathematical model of the entire pneumatic machine system of the blow moulding machine, a plurality of process parameters are calculated and/or set already when a few process parameters are input, and particularly preferably already prior to the start of production.

Preferably, a qualitative and quantitative determination of system variables of the pneumatic system or of the apparatus for transforming plastic preforms into plastic containers takes place. Since—as mentioned above—a precise analytical calculation of an individual pneumatic system is in each case extremely complicated and is subject to a large degree of uncertainty, it is proposed that the system behaviour is determined empirically and in particular empirically on the basis of a test setup. The machine model is thus preferably determined or provided on the basis of this test setup. Preferably, the test setup has characteristic variables or features which are also characteristic of the starting-up of the machine.

Advantageously, a plurality of pressure stages are acted upon the plastic preforms. Advantageously, at least two pressure stages are acted upon, namely in particular a pre-blowing pressure and a finish-blowing pressure. With particular preference, times are predefined for acting upon with the different pressures. For instance, it is possible that firstly a pre-blowing pressure being acted upon the container and then a finish-blowing pressure.

Preferably, the calculation of the respective process parameters is carried out not on the machine itself but rather on a machine model. In this way, the calculation of the process data can be carried out outside of machine operation.

In a further preferred method, the system behaviour is determined on a test setup. This test setup may in parts coincide with the machine that is actually to be set up or started up.

In a further preferred method, the number of process parameters is greater than the number of input parameters. This means that only a predefined number of input parameters are predefined for the model, and the latter then additionally determines further process parameters. Advantageously, the test setup copies the real machine. In addition, at least one input parameter and preferably several input parameters may be process parameters of the machine.

Therefore, whereas process variables are detected and a given control variable is readjusted during production in the prior art, it is proposed here that the process parameters are determined on the basis of a few process parameters which the operator alone varies in order to adapt them to the respective specific product and/or the respective specific machine.

In this case, a distinction is advantageously made between at least two types of process parameters, which will be referred to below as main process parameters and as auxiliary process parameters. The main process parameters are preferably parameters which have a significant or large influence on the result of the blow moulding process or stretch blow moulding process, such as, for example, the start of pre-blowing, the end of pre-blowing and/or the start of an intermediate blowing or the pre-blowing pressure or the finish-blowing pressure. The auxiliary process parameters are preferably process parameters which have no influence or only a small influence on the result of the stretch blow moulding process.

In a further preferred method, the apparatus not only acts upon one or more blowing pressures to the containers but additionally also stretches the plastic preforms in their longitudinal direction. For this purpose, stretching rods are introduced into the plastic preforms, which stretch the latter in their longitudinal direction.

In a further preferred method, the input parameters include main process parameters which describe the stretch blow moulding operation. These are, in particular, the important parameters of the stretch blow moulding process that have already been mentioned above. In particular, these main process parameters are time values and/or pressure values.

In a further preferred method, the input parameters include container parameters which are characteristic of the plastic preforms to be expanded and/or of the plastic containers to be produced. These may be, for example, a volume of the containers to be produced or a setting of a throttle for a pre-blowing operation or a material of the plastic preform or a design of a mouth region of the plastic preform. These input parameters are preferably product-dependent constants.

In a further preferred method, the processor unit determines, on the basis of the input parameters, auxiliary process parameters which also describe the stretch blow moulding operation. As mentioned above, these auxiliary process parameters are those parameters which have a lesser influence than the main process parameters on the stretch blow moulding operation. For example, such auxiliary process parameters can be used to determine limit values, for instance maximum and minimum values.

A calculation of the auxiliary process parameters is thus particularly preferably carried out on the basis of the product-dependent parameters and the main process parameters. The auxiliary process parameters may in this case be, for example, those parameters which are responsible for a recycling of blowing air. In the method described here, blowing air is preferably recycled, that is to say that blowing air is fed back into the compressed air reservoir, and in particular into compressed air reservoirs which provide a lower blowing air pressure.

Preferably, a test setup which reproduces the pneumatic properties of the machine to be operated is created outside of working operation. Measurement series can also be carried out, wherein for example a given variable (for example an explanatory variable) has been altered in a targeted manner and the effect of further variables thereon is examined. For example, it is possible to examine how a change in the container volume, a change in the pre-pressure in the container, a change in the blowing pressure, in a stretching rod diameter, a stretching rod function or a throttle position of a pre-blowing valve affects other variables. It is possible that, in a test setup, pressure is fed in each case via existing valves for the pre-blowing, intermediate blowing and finish-blowing. In addition, the pressure release operation can also be examined for the variables described here, that is to say the section in which blowing air is released again from the container following the production of the latter.

Advantageously, said measurements are examined in a predefined cycle, for example are examined and recorded in a cycle of 400 μs.

Preferably, the dependency of these measurement variables on the variables or parameters described above is reproduced by mathematical methods, wherein to this end in particular a regression analysis is carried out. In particular, this dependency is reproduced by nth degree polynomials, for example third, fourth or fifth degree polynomials.

In a further preferred method, these mathematical relationships thus determined are implemented in a software model or software solution. This can then preferably be integrated in a machine visualization. This preferably then aids the machine operator with the machine running time following calculation of the specified values. However, a corresponding calculation is thus preferably carried out already before the start of production. But an adaptation of the calculation during operation of the machine and in particular during a production mode of the machine may additionally be carried out.

In a further advantageous method, the main process parameters are selected from a group of parameters which includes a start time of pre-blowing, a start time of intermediate blowing, a start time of finish-blowing, a pre-blowing pressure and a finish-blowing pressure. These values could also be initial values, which are then refined and adapted by a control.

In a further preferred method, at least one process parameter is determined on the basis of at least one measured value and/or input value and preferably also using an nth degree polynomial. These are preferably time-dependent polynomials.

In a further advantageous method, the process parameters are generally selected from a group of process parameters which includes an end of the intermediate blowing operation, an intermediate blowing pressure, a start of a finish-blowing operation, at least one parameter for a recycling controller for recycling blowing air, and a start of pressure release. The parameters for a recycling controller may be, for example, a start value for a recycling controller for recycling the pre-blowing air. This may be, for example, a pressure value beyond which blowing air is returned. It may also be a time value at which or after which a return is started. The value for a recycling controller may also be a maximum value, that is to say a maximum value beyond which blowing air is recycled.

The value for the pre-blowing may also be an I-factor, that is to say the factor which controls the pressure return course. The value may also be values for the intermediate blowing and once again here—as described—the I-factor, a start value and/or a maximum value.

In a further preferred method, the process parameters are output to the user by means of a visualization unit. For example, a monitor may be provided which enables an outputting of determined process parameters to the user. It would also be possible that these process parameters thus determined are transferred to a machine. Advantageously, however, it is conceivable that the user can also influence the process parameters thus determined.

In a further preferred method, said process parameters are determined prior to a production start of the apparatus. There is preferably no need for an initial adjustment of the process parameters.

To this end, approximation polynomials for the course of pressure over time in the container can be derived from the abovementioned measurement data. From these approximation polynomials, and preferably also taking account of the pneumatic structure of a blow moulding machine that is already in existence and/or also of a stretch blow moulding sequence, preferably the model which reproduces the characteristic values of a stretch blow moulding operation is then created.

From the product-dependent constant process parameters having a large influence on the result, that is to say the main process parameters, the abovementioned model thus calculates those process parameters which have no influence or barely any influence on the result of the stretch blow moulding operation. These may be, for example, those parameters which describe the recycling of blowing air. The auxiliary process parameters therefore preferably also include those parameters which describe a recycling of blowing air.

The present invention is also based on the fact that the pneumatic system is substantially identical in all types of machine and thus can be determined once and in advance on a test setup. In this way, a plurality of advantages are obtained over an exclusive control method. Firstly, a control is always dependent on the measurement accuracy, that is to say it must always be ensured that the measured value is correct and no faulty operating state exists. Furthermore, the pressure in the container is critical to the precise determination of the process variables for the stretch blow moulding process. However, said pressure cannot be measured during production.

The measurement of the blowing pressure preferably takes place in a valve block. However, it has been found that this measured pressure differs considerably from the actual pressure in the container, particularly during the pressure change phases. This means, however, that no pressure value necessary for determining the parameters is available in the prior art. By virtue of the method described here, however, the determined parameters are already available prior to the start of production. The operator therefore need not set any start values for the parameters to be determined.

Furthermore, no production is necessary for the initial adjustment of the parameters to be determined. In this way, it is possible to avoid production phases in which the result changes due to the control process and possibly leads to waste. In addition, the control process usually requires a relatively long continuous production with no change of output parameters, in which the control variable can stabilize.

In a further preferred method, the process parameters are at least partially determined prior to a production start of the apparatus. Preferably, the process parameters are at least partially determined prior to a first start-up of the machine. In this case, it is possible that the process parameters are determined at least partially and preferably at least at times outside of operation of the machine. In addition, it would also be possible that the process parameters are first determined for a plurality of machines of the same kind and preferably are transferred to said machines, in particular to control systems of said machines, only at the time of start-up of said machines.

After a change in the process parameters, the determined parameters are immediately available. This applies in particular during the first adjustment measures for a new product, during which the process parameters are very often changed. In these cases, in the prior art normally a relatively long period of production is necessary until all the control variables have stabilized. Since this is not necessary with the described method, the stabilization process can be considerably shortened.

In a further preferred method, the described model is expanded in such a way that it adapts automatically to a blow moulding machine and in this way can compensate the effects of ageing and machine-specific tolerances. In this method, the measured values are preferably evaluated during production for the running time of the machine and the model is adapted in small iteration steps. In this way, the model described above can be adapted in particular also to phenomena such as ageing of the machine. Preferably, such an adaptation can also be achieved outside of operation, by supplying modified measured values.

In a further preferred method, measured values which are characteristic of an operating state of the apparatus are supplied to the machine model at least at times. This embodiment of the method is directed in particular to operation of the apparatus, that is to say the period after start-up. It is possible here that measured values are recorded during operation and these are in turn supplied to the model. The machine model can preferably be adapted on the basis of these measured values, which may change for example on account of ageing. It would also be possible that changes in these measured values are detected.

The present invention is also directed to a machine arrangement comprising an apparatus for transforming plastic preforms into plastic containers, which has a movable carrier, on which a plurality of transforming stations for transforming the plastic preforms into the plastic containers are arranged. Furthermore, these transforming stations each have stressing devices which act upon a gaseous medium to the plastic preforms (in particular in order to expand the latter). The apparatus furthermore has a control device which controls the transforming operation on the basis of a plurality of process parameters. The gaseous medium, which in particular is blowing air, is in this case introduced in particular into an interior of the plastic preforms.

According to the invention, the machine arrangement also has a machine model which is operable independently of the apparatus and by which a plurality of process parameters is determinable on the basis of this machine model, wherein a predefined number of input parameters is transferable to this machine model and at least one processor unit determines the process parameters and/or values characteristic of these process parameters on the basis of these input parameters. The apparatus is preferably a blow moulding machine and in particular a stretch blow moulding machine. It is therefore also proposed, with regard to the apparatus, that a model is present on which or by means of which the respective process parameters can be determined.

A machine model which is operable independently of the machine arrangement and/or the apparatus will be understood to mean in particular that said machine model is operable independently of an operating state of the apparatus and in particular also independently of whether said apparatus has already been set in operation. In addition, however, it is also conceivable that values, such as measured values in particular, are transferred to the model during operation of the machine and the model also takes these values into account.

In a further advantageous embodiment, the apparatus for transforming the plastic preforms into plastic containers also has a heating device which serves for heating plastic preforms. The parameters of said heating device, such as, for example, a heating power of heating devices or a speed of rotation of the plastic preforms during the heating, can also be taken into account in the calculation process described here. Preferably, the machine arrangement also has a display device, by means of which process parameters and other values can be output.

Figure 1:
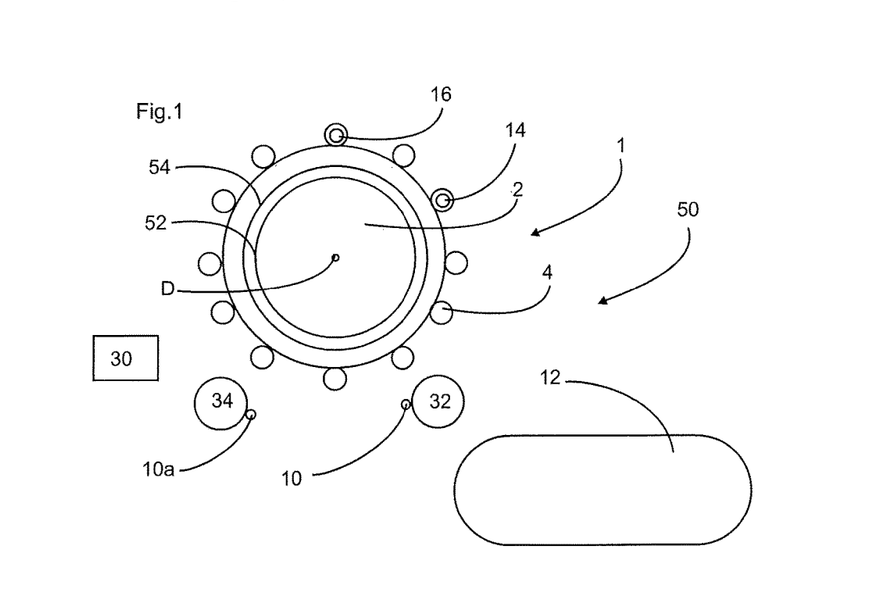
FIG. 1 shows a highly schematic diagram of an apparatus according to the invention.

FIG. 1 shows a highly schematic diagram of a blow moulding machine 1. This machine has a carrier 2 (a so-called blowing wheel) which is able to rotate about an axis of rotation D and on which a plurality of transforming stations 4 for transforming plastic preforms 10 into plastic containers 10a are arranged. These transforming stations 4 each have stretching rods 14 (of which only one is shown), by means of which the plastic preforms 10 can be stretched in their longitudinal direction. The movement of these stretching rods is brought about by drive devices, such as linear motors. In addition, it would also be conceivable that a guide cam is provided which brings about the movement of the stretching rod.

In addition, the transforming stations 4 also each have stressing devices 16, such as, for example, blowing nozzles (of which only one is shown), which act upon the gaseous medium, such as in particular blowing air, to the plastic preforms 10 in order to expand the latter. This blowing air may be provided, for example, by means of reservoirs such as ring-shaped channels 52, 54, which supply the individual transforming stations 4 with blowing air. The individual transforming stations 4 preferably each also have valve devices which control the supply of blowing air to the plastic preforms 10. These valve devices may be arranged in valve blocks.

Reference 30 denotes a control device which serves for controlling the apparatus. This control device may be provided with parameters by the machine model described above. The individual transforming stations may each also have control systems. In this case, it would be possible that the control device 30 in turn actuates these control systems of the individual transforming stations (for instance as a master control system).

Reference 12 denotes in a highly schematic manner a heating device or a furnace which heats the plastic preforms 10. It would be possible that the machine model described above also determines parameters of this heating device 12. Reference 32 denotes a feed device, such as a feed starwheel, for feeding the plastic preforms 10 to the transforming stations, and reference 34 denotes a removal device, such as a removal starwheel, for removing the blown containers 10a. Reference 50 denotes the machine arrangement as a whole.

Figure 2:
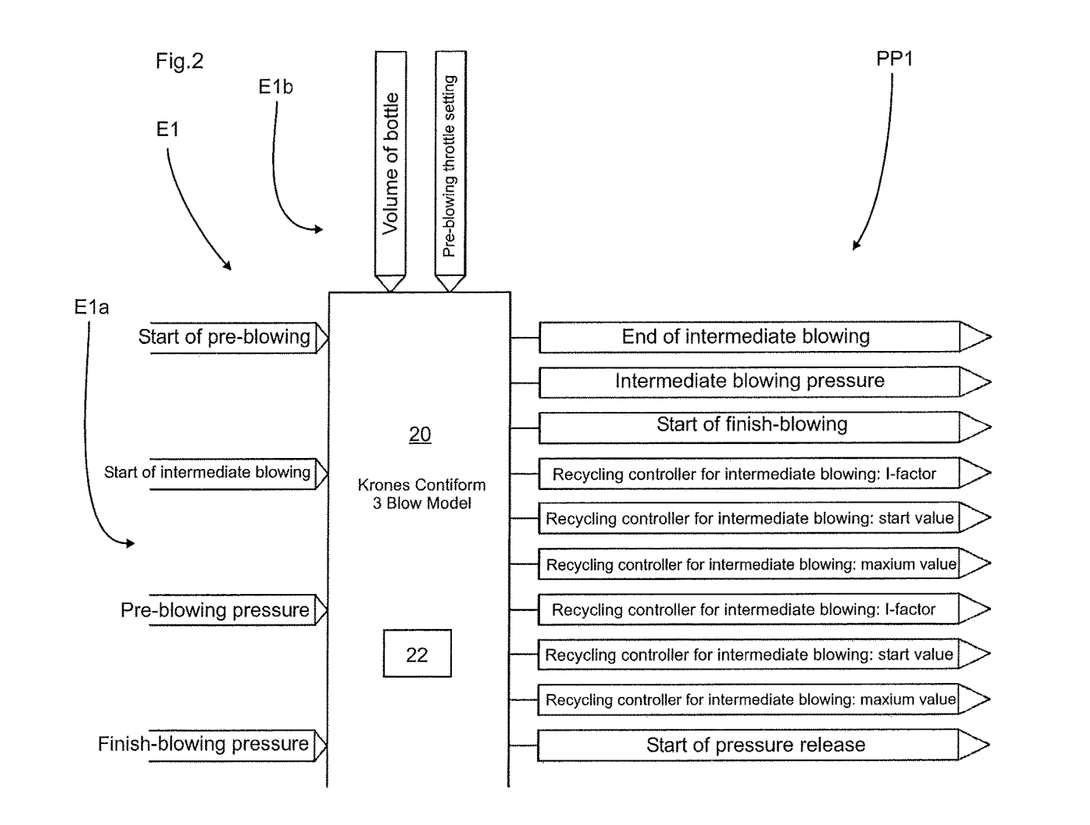
FIG. 2 shows a diagram to illustrate the method according to the invention.

FIG. 2 shows a highly schematic diagram to illustrate a method according to the invention. Here, reference 20 denotes a calculation model (shown only schematically) or a (machine) model of a blow moulding machine. Input values E1 are fed to this mathematical model. Reference E1a denotes the main process parameters and reference E1b denotes container parameters. The illustrated main process parameters, that is to say the start of pre-blowing, the start of intermediate blowing, a pre-blowing pressure and a finish-blowing pressure, are significant parameters or variables which determine the quality of the container thus produced. The input values E1b are characteristic of the container to be expanded.

Reference 22 denotes a processor unit which carries out the calculation of the individual parameters, in particular of the process parameters. This processor unit may have one or more calculation devices such as, for instance, addition elements, subtraction elements, multiplication elements, polynomial solvers and the like.

On the basis of these values, the model calculates further values, more particularly process parameters PP1, which have little or no influence on the container to be produced, such as, for example—as shown in FIG. 2—an end of intermediate blowing, an intermediate blowing pressure and a start of finish-blowing. The further process parameters relate largely to the recycling of blowing air, that is to say one recycling controller which relates to the pre-blowing operation and one recycling controller which relates to the intermediate blowing. It is pointed out here that the pre-blowing pressure is usually lower than the intermediate blowing pressure, and the intermediate blowing pressure is usually lower than the finish-blowing pressure.

For recycling purposes, blowing air can be fed back into a reservoir which holds the intermediate blowing pressure and also into a reservoir which holds the pre-blowing pressure. The respectively determined values include—as shown in FIG. 2—the respective I-factor, a start value and a maximum value, which are each characteristic of the pre-blowing operation or of the intermediate blowing operation. These values have no influence on the production of the containers but rather on the energy efficiency of the system, which is also affected by the efficiency of recycling of compressed air.

FIGS. 3a-3d illustrate the determination of the individual parameters. It is pointed out that FIGS. 3a-3d are to be regarded as belonging together and are parts of an overall diagram. The transitions between the figures are marked in each case.

Figure 3A:
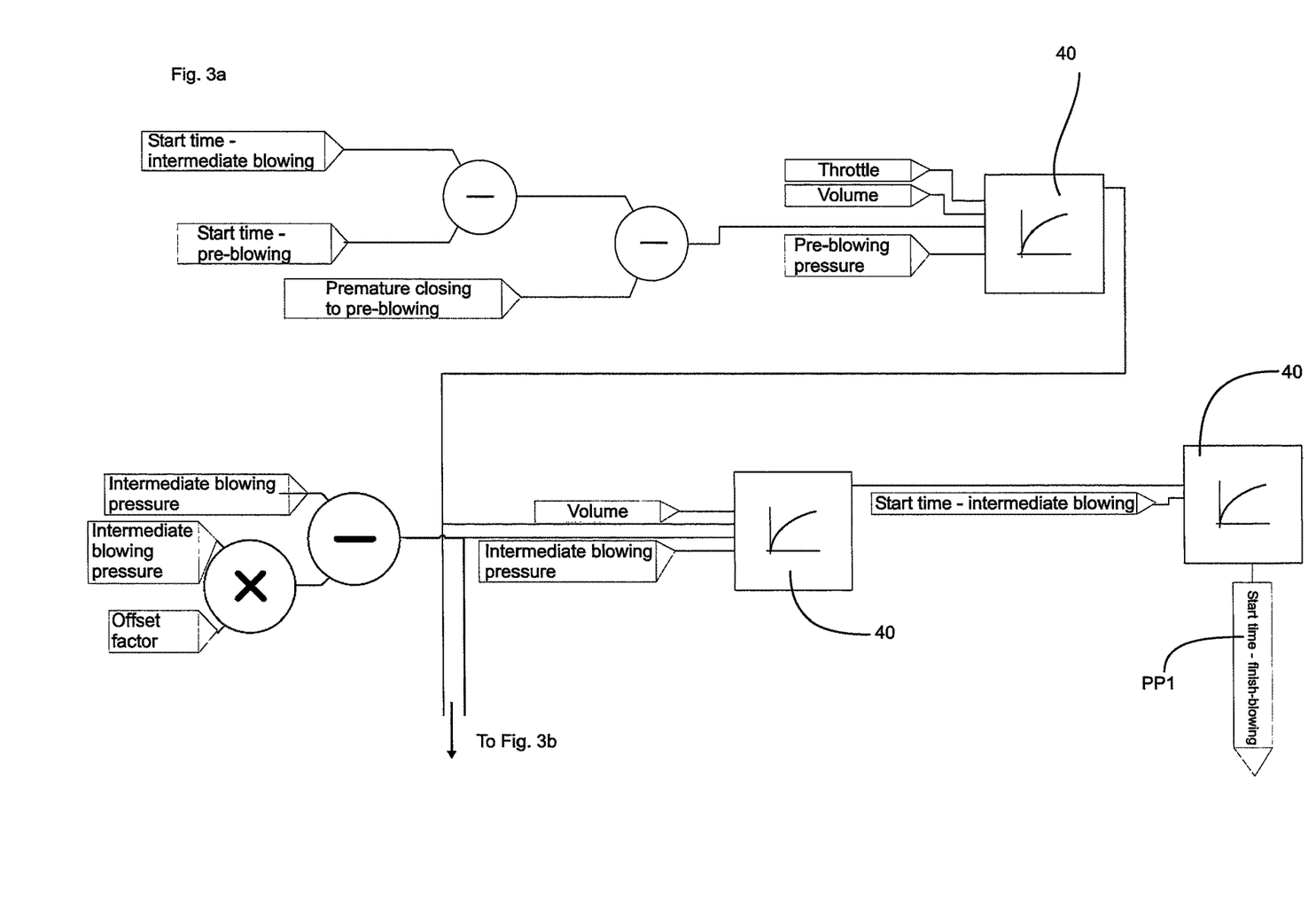
FIGS. 3a-d show four diagrams to illustrate a sequence of a method according to the invention.

As shown in FIG. 3a, a start time for the intermediate blowing and a start time for the pre-blowing are predefined and the start time for the pre-blowing is subtracted from the start time for the intermediate blowing. As can also be seen from FIG. 2, these two values are main process parameters. A value relating to a premature closing to pre-blowing can in turn be subtracted from this time difference. These values are in turn fed to a calculation device 40, here a polynomial solver, together with a value which characterizes a throttle setting, the container volume and a pre-blowing pressure, which is likewise a main process parameter.

Said calculation device ultimately determines therefrom, while taking account of the container volume and the intermediate blowing pressure, a start time for finish-blowing, wherein a start time for the intermediate blowing is used here as a further parameter. Two calculation devices 40 in the form of polynomial solvers are again used for the calculation. To this end, the intermediate blowing pressure and also an offset factor are taken into account.

Figure 3B:
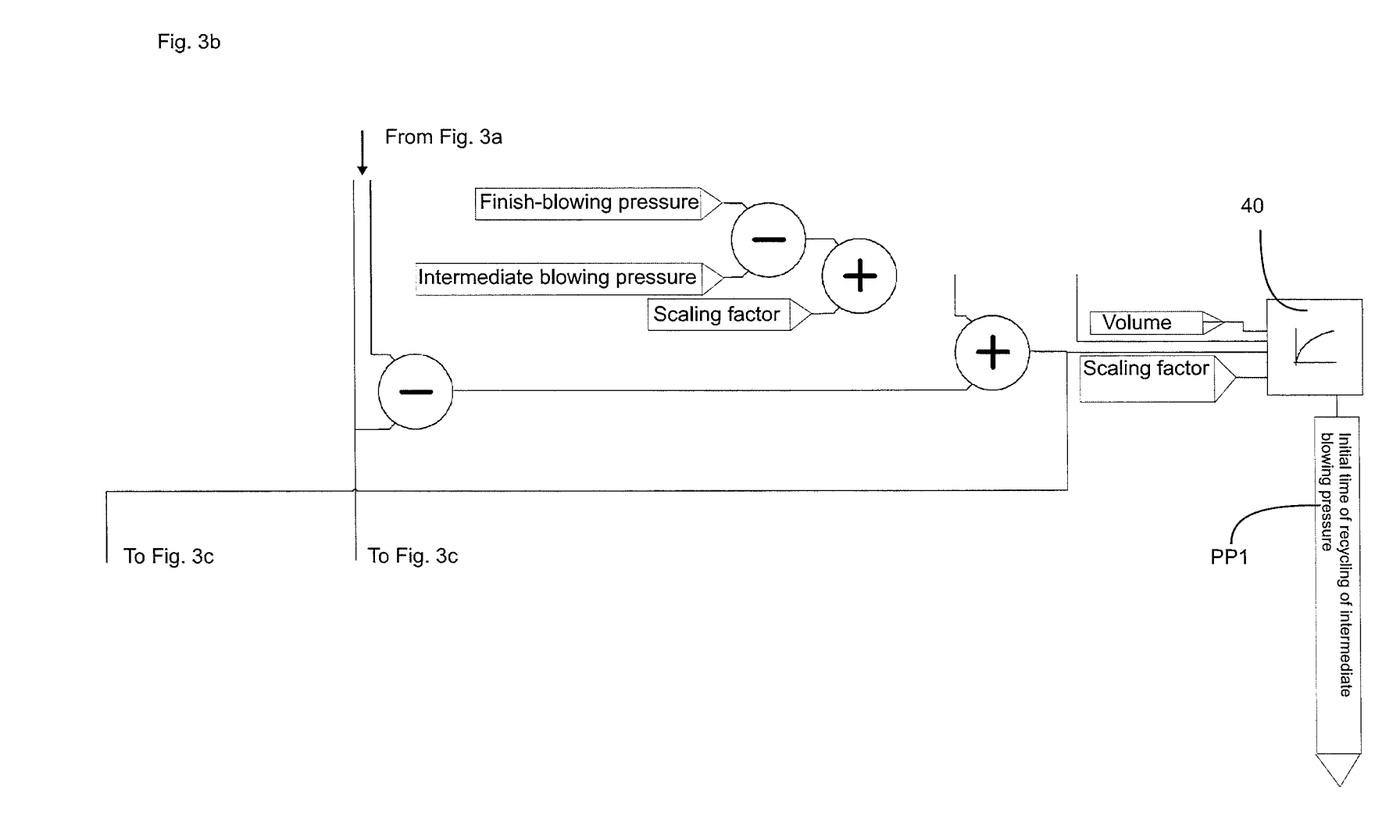
Figure 3C:
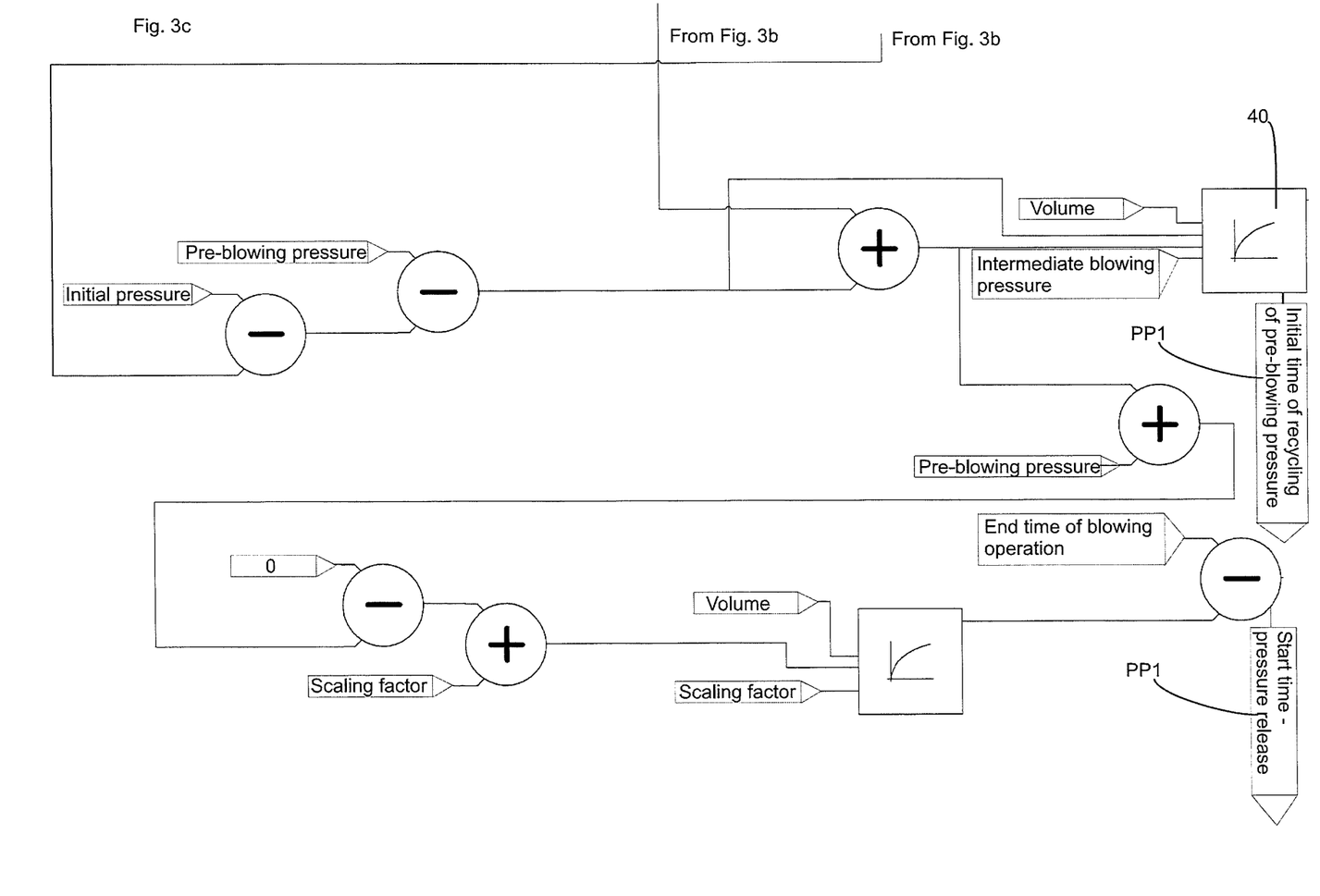

In addition, the value thus determined is also used to determine for example, via a further calculation, the start time for the recycling of the intermediate blowing pressure. It is pointed out that the diagram shown in FIGS. 3a-3c is to be understood solely by way of example. As can be seen from FIG. 3c, the initial time for the recycling of the pre-blowing pressure as well as the start time for a pressure release of the container can in turn be determined using the pre-blowing pressure and the initial pressure. These values are the process parameters PP1. It can be seen that numerous subtractions and additions are carried out for the calculation, and in some cases scaling factors are also taken into account.

Figure 3D:
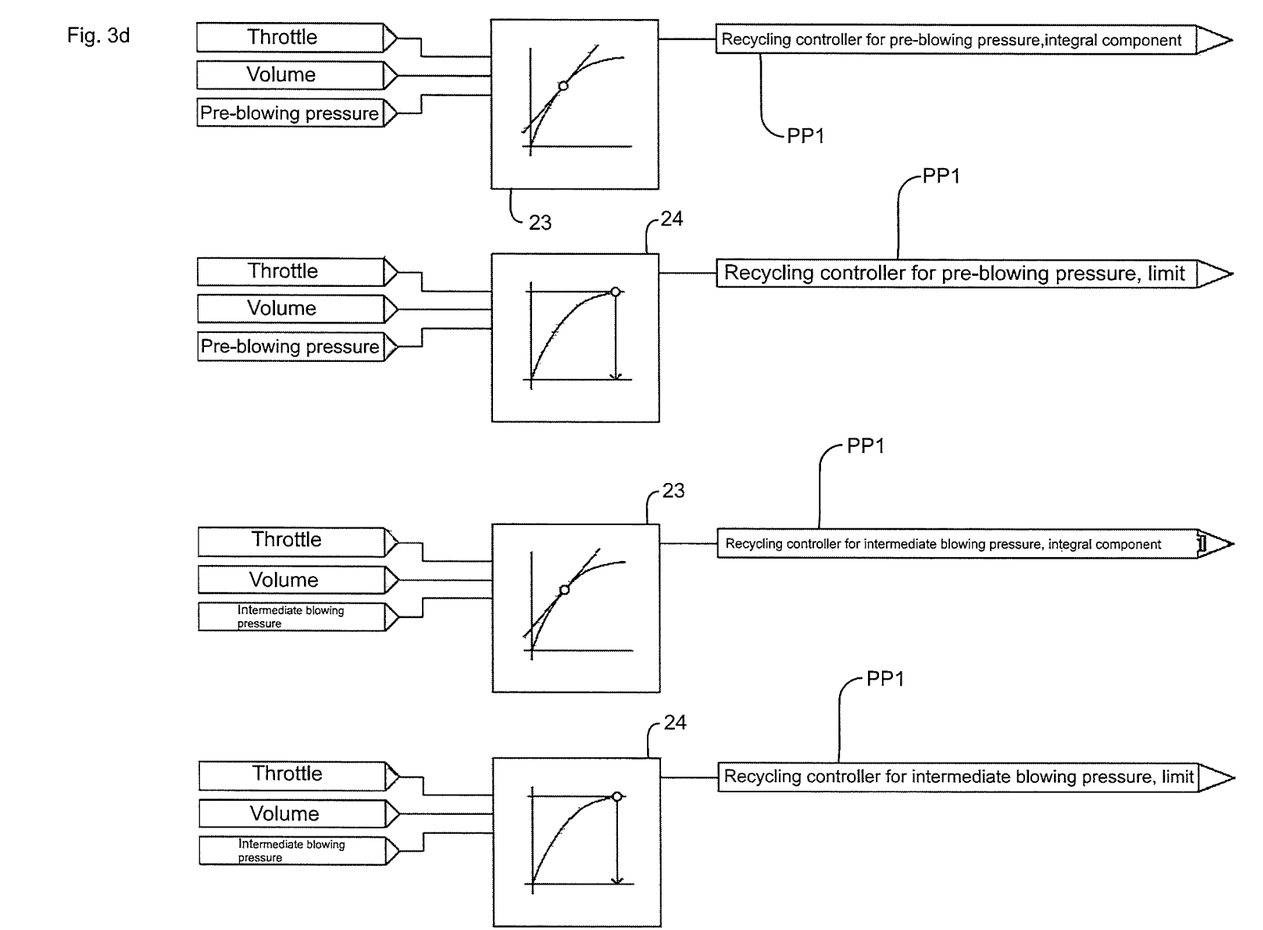

FIG. 3d illustrates the determination of the values for the recycling controller of the pre-blowing pressure and the recycling controller for the intermediate blowing pressure, that is to say in each case the integral components and the limits. In order to determine these values, in each case use is again made of the throttle values, the volume values and the pre-blowing pressure or intermediate blowing pressure.

Reference 40, which is shown for exemplary in FIG. 3a, denotes a polynomial solver. This polynomial solver contains the polynomials describing the pneumatic system of the blow moulding machine. On the basis of boundary conditions and a scaling, such as a Y-scaling and a threshold value, specific points on the graph of the polynomial can be sought and output.

Reference 23 in FIG. 3d denotes or describes the calculation of the integral factor. Here, too, the polynomials describing the pneumatic system of the blow moulding machine are also present or used as a basis. The integral components required for the optimum value of an I-controller are calculated on the basis of solution formula.

Reference 24 in FIG. 3d denotes the calculation of a maximum value. Here, too, the polynomials contained as the pneumatic system of the blow moulding machine are used as a basis. Based on this polynomial, the time value assigned to a threshold value is determined.

Figure 4:
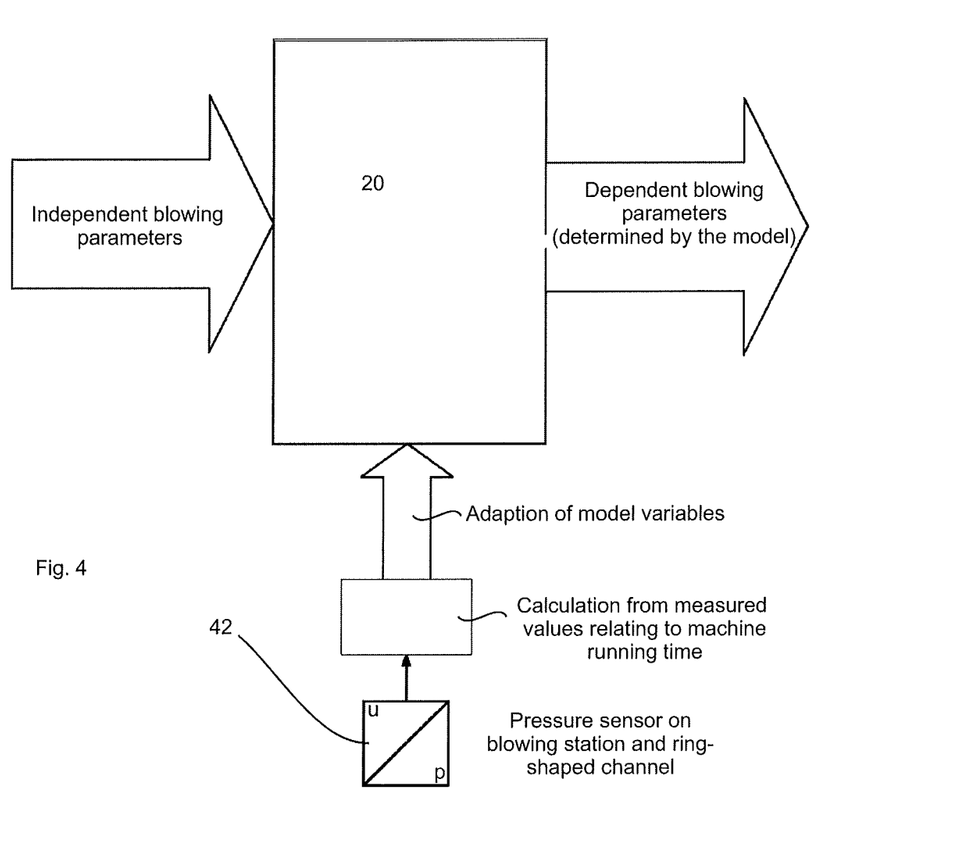
FIG. 4 shows a diagram of a further advantageous method.

FIG. 4 shows a further diagram to illustrate the calculation. Here, too, the mathematical (machine) model 20 is again used as a basis. Independent blowing parameters are input into this model, in particular by a user. Measured values, in particular relating to the machine running time, are furthermore recorded for example via a pressure sensor of the individual blowing stations or a ring-shaped channel. Based on these measured values, which may be characteristic for example of an ageing of the machine, an adaptation of model variables is carried out and these adapted model variables are fed to the (machine) model 20.

As a function of these adapted model variables, the model then outputs dependent blowing parameters which have been able to be determined by the model. Therefore, as shown in FIG. 4, the mathematical model is expanded in such a way that it also adapts automatically to the blow moulding machine and thus compensates in particular the effects of ageing and machine-specific tolerances. Preferably, however, it would also be possible that this calculation is also performed outside of machine operation. However, this calculation is once again based on measurements which have been carried out on the real machine. Preferably, therefore, with the aid of these measured values, the mathematical model itself is adapted and preferably also customized to the actual machine being operated.

FIG. 4 thus also describes a possibility by which, in addition to the input values mentioned above, account is also taken of values specific to the machine which take account of the ageing thereof. Here, too, the calculation can again take place on the basis of the polynomials mentioned above, but is no longer based or is no longer only based on preset values of a model machine but rather on actually determined values from the running operation of the machine to be operated.

With particular preference, therefore, a further method step also uses measured values recorded on the real machine to output or to modify blowing parameters. Said measured values are thus particularly preferably used to adapt the machine model.

The applicant reserves the right to claim as essential to the invention all the features disclosed in the application documents in so far as they are novel individually or in combination with respect to the prior art. It is also pointed out that features which may be advantageous per se have also been described in the individual figures. The person skilled in the art is immediately aware that a specific feature described in one figure may be advantageous even without adopting further features from said figure. The person skilled in the art is moreover aware that advantages may also result from a combination of multiple features shown in individual or different figures.

What is claimed is:

1. Method for operating an apparatus for transforming plastic preforms into plastic containers, comprising:
   providing the apparatus, wherein the apparatus comprises a blow moulding machine, a control device and a machine model, wherein the machine model comprises at least one processor unit programmed with mathematical relationships of input parameters and process parameters, the input parameters include main process parameters which describe a stretch blow moulding operation and container parameters which are characteristic of the plastic preforms to be expanded and/or of the plastic containers to be produced, the main process parameters are selected from a group of parameters which includes a start time of pre-blowing, a start time of intermediate blowing, a pre-blowing pressure and a finish-blowing pressure;
   transferring a predefined number of input parameters to the at least one processor unit of the machine model;
   determining a plurality of process parameters and/or values characteristic of the plurality of process parameters with the at least one processor unit of the machine model based on the predefined number of input parameters and the mathematical relationships;
   transferring the plurality of process parameters and/or values characteristic of the plurality of process parameters to the control device;
   controlling the blow moulding machine with the control device on the basis of the plurality of process parameters and/or values characteristic of the plurality of process parameters;
   performing the stretch blow moulding operation by applying a flowable medium to the plastic preforms with the blow molding machine to transform the plastic preforms into plastic containers while taking account of the plurality of process parameters and/or values characteristic of the plurality of process parameters.

2. Method according to claim 1, wherein at least one of the mathematical relationships is an nth degree polynomial.

3. Method according to claim 1, wherein the plurality of process parameters are selected from a group of process parameters which includes an end of an intermediate blowing operation, an intermediate blowing pressure, a start of a finish-blowing operation, a parameter for a recycling controller for recycling blowing air, and a start of pressure release.

4. Method according to claim 1, wherein the plurality of process parameters are at least partially determined prior to a production start of the blow molding machine.

5. Method according to claim 1, further comprising:
   arranging a plurality of transforming stations configured for transforming the plastic preforms into the plastic containers on a movable carrier of the blow moulding machine;

providing stressing devices on each of the transforming stations configured for applying the flowable medium to the plastic preforms.

6. Method according to claim 1, further comprising:
determining auxiliary process parameters with the at least one processor unit of the machine model based on the predefined number of input parameters and the mathematical relationships, wherein the auxiliary process parameters are parameters that have minimal influence on the stretch blow moulding operation.

7. Method according to claim 1, further comprising:
measuring values which are characteristic of an operating state of the blow molding machine; and
supplying the measured values to the machine model at least at times.

8. An apparatus for transform plastic preforms into plastic containers, comprising:
a blow moulding machine;
a machine model; and
a control device electrically connected to the blow molding machine and the machine model; wherein:
the blow molding machine comprises a movable carrier, on which a plurality of transforming stations configured for transforming the plastic preforms into the plastic contain are arranged, wherein each of the transforming stations has stressing devices configured for applying a gaseous medium to the plastic preforms;
the machine model comprises at least one processor unit programmed with mathematical relationships of input parameters and process parameters, the input parameters include main process parameters which describe a stretch blow moulding operation and container parameters which are characteristic of the plastic preforms to be expanded and/or of the plastic containers to be produced, the main process parameters are selected from a group of parameters which includes a start time of pre-blowing, a start time of intermediate blowing, a pre-blowing pressure and a finish-blowing pressure;
the machine model is configured to determine a plurality of process parameters and/or values characteristic of the plurality of process parameters via the at least one processor unit based on a predefined number of input parameters and the mathematical relationships;
the control device is configured to receive the plurality of process parameters and/or values characteristic of the plurality of process parameters and to control the blow molding machine on the basis of the plurality of process parameters and/or values characteristic of the plurality of process parameters; and
the blow molding machine is configured to apply the gaseous medium to the plastic preforms to transform the plastic preforms into plastic containers while taking account of the plurality of process parameters and/or values characteristic of the plurality of process parameters.

* * * * *

UNITED STATES PATENT AND TRADEMARK OFFICE
CERTIFICATE OF CORRECTION

PATENT NO. : 10,611,076 B2
APPLICATION NO. : 14/929464
DATED : April 7, 2020
INVENTOR(S) : Markus Haller It is certified that error appears in the above-identified patent and that said Letters Patent is hereby corrected as shown below:

In the Claims

Claim 5, Column 10, Line 68: please insert --and-- after "the blow moulding machine;"

Claim 8, Column 11, Line 16: please delete "transform" and replace with --transforming-- after "An apparatus for"

Claim 8, Column 11, Line 25: please delete "contain" and replace with --containers-- after "transforming the plastic pre-forms into the plastic"

Signed and Sealed this
Seventh Day of July, 2020

Andrei Iancu
*Director of the United States Patent and Trademark Office*